United States Patent [19]

Tkachuk

[11] Patent Number: 5,520,314
[45] Date of Patent: May 28, 1996

[54] REMOVABLE ONE-PIECE TRUCK BED DIVIDER

[75] Inventor: Peter R. Tkachuk, Exeter, N.H.

[73] Assignee: The United States of America as represented by the Secretary of the Navy, Washington, D.C.

[21] Appl. No.: 322,654

[22] Filed: Oct. 11, 1994

[51] Int. Cl.⁶ .................................................. B60R 9/00
[52] U.S. Cl. ................................. 224/403.000; 224/405; 224/542; 224/539; 296/37.6
[58] Field of Search .............................. 224/42.42, 311, 224/42.11, 279, 273, 328, 402, 403, 404, 405, 925, 539, 542; 296/37.1, 37.6

[56] References Cited

U.S. PATENT DOCUMENTS

| | | | |
|---|---|---|---|
| 4,029,244 | 6/1977 | Roberts | 224/42.42 |
| 4,199,186 | 4/1980 | Faverino | 296/37.1 |
| 4,684,087 | 8/1987 | Spickard | 224/42.42 |
| 4,936,624 | 6/1990 | West | 296/37.6 |
| 4,944,544 | 7/1990 | Dick | 224/42.42 |
| 4,946,215 | 8/1990 | Taylor | 224/42.42 |
| 5,147,103 | 9/1992 | Ducote | 296/37.6 |
| 5,169,200 | 12/1992 | Pugh | 224/42.42 |
| 5,201,561 | 4/1993 | Brown | 296/37.6 |

FOREIGN PATENT DOCUMENTS

| | | | |
|---|---|---|---|
| 2169877 | 7/1986 | United Kingdom | 224/273 |
| 2247651 | 3/1992 | United Kingdom | 296/37.1 |

*Primary Examiner*—Henry J. Recla
*Assistant Examiner*—Gregory M. Vidovich
*Attorney, Agent, or Firm*—Michael J. McGowan; James M. Kasischke; Prithvi C. Lall

[57] ABSTRACT

A truck bed divider having a unitary, one-piece structure which may be easily positioned in and instantly removed from a truck bed includes a dividing portion having a plurality of bars for preventing articles in the truck bed from moving or sliding in the truck bed. The divider further includes top and bottom frame portions which are joined to the divider portion and which support the divider portion in the truck bed. Retaining or bracing portions brace the truck bed divider against the truck bed.

9 Claims, 1 Drawing Sheet

REMOVABLE ONE-PIECE TRUCK BED DIVIDER

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

1. Field of the Invention

The present invention relates to truck bed dividers for containing loose articles and more particularly, to a removable, one-piece truck bed divider.

2. Description of Prior Art

Trucks, such as pick-up trucks having a truck bed, are useful for transporting cargo such as tools, wood, equipment, etc. Often, tools and other such loose articles must be contained in one section of the pick-up truck bed to prevent the loose articles from sliding around in or out of the truck bed and damaging the cargo itself, the truck bed or individuals. In the past, enclosed boxes have been designed for the bed of a pick-up truck to hold tools and other small articles which are susceptible to sliding and moving in the bed of the truck. However, such enclosed boxes are designed primarily for small tools or other small articles. The limitations in space make the enclosed boxes unsuitable for holding larger and more awkwardly shaped tools or articles in the bed of a truck.

Other truck bed compartments include pivotable cages which must be coupled or fastened to the truck and require assembly of multiple moving pieces. Such devices often take considerable amounts of time to assemble and secure to the bed of the truck. Once these truck bed cages having multiple moving pieces are assembled and fastened to a truck bed, they are not easily removed. Further, such devices having pivotable parts do not allow for articles to be easily placed in and removed from the compartment in the truck bed.

Accordingly, what is needed is a truck bed divider which is a unitary, one-piece structure and which is further easily positioned and removed from the bed of a truck. Further, the truck bed divider should not require moving or pivoting any pieces after the divider has been positioned in the truck. Finally, the truck bed divider should have an open top portion allowing large and awkwardly shaped articles to extend above the top of the truck bed while still being held securely by the truck bed divider.

SUMMARY OF THE INVENTION

A truck bed divider according to the present invention is a removable, one-piece structure which is adapted to removably sit in and fit the contour of a region of a truck bed for containing loose articles in the truck bed. The truck bed divider includes a dividing portion having a plurality of bars extending from a top region of the truck bed to a bottom region of the truck bed to prevent loose articles contained in the truck bed from moving to another region of the truck bed.

The truck bed divider further includes a top frame portion which is one piece with the dividing portion and is adapted to extend in a plane parallel to the top region of the truck bed. The top frame portion is open to allow for articles to extend above the top region of the truck bed. In a preferred embodiment, the top frame portion is generally rectangular shaped and is adapted to be positioned or lie against side portions of the truck bed.

The truck bed divider further includes a bottom frame portion which is one piece with the dividing portion and is adapted to be positioned against the bottom portion of the truck bed. In a preferred embodiment, the bottom frame portion is generally rectangular shaped and is adapted to be positioned between wheel wells or wheel well regions in the bed of the truck.

The truck bed divider further includes at least one divider restraining portion adapted to abut a portion of the truck and prevent movement of the truck bed divider in the truck bed. In a preferred embodiment, the truck bed divider is adapted to fit between the cab of the truck and the wheel wells of the truck. In this preferred embodiment, the divider restraining portion includes bracing bars extending from the bottom frame portion and adapted to abut the wheel wells for preventing movement in the truck bed.

In the preferred embodiment, the truck bed divider is made of steel and the top frame portion, the dividing portion and the bottom frame portion are welded together as one piece. In another embodiment, the truck bed divider is made of molded plastic, and the top frame portion, the dividing portion and the bottom frame portion are molded together as one piece.

In a preferred embodiment, the truck bed divider further includes at least one support bar extending between the top frame portion and the bottom frame portion, for supporting the top frame portion and bottom frame portion in a spaced parallel relationship.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawing wherein.

DETAILED DESCRIPTION OF THE INVENTION

Figure 1:
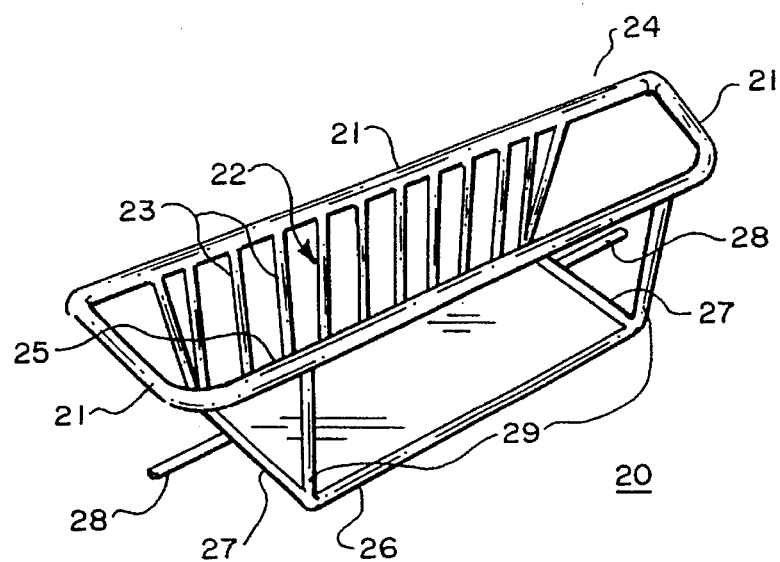
FIG. 1 is a perspective view of the removable, one-piece, truck bed divider according to the present invention.

The removable, one-piece truck bed divider 20, FIG. 1, according to the present invention is adapted to be removably positioned in a truck bed of a pick-up truck. The removable, one-piece truck bed divider 20 includes a dividing portion 22 for containing loose articles such as tools, wood, or other equipment. The dividing portion 22 of the truck bed divider 20 prevents the loose articles from moving or sliding in the truck bed or out of the truck.

The dividing portion 22 is supported by and is one-piece with a top frame portion 24 and a bottom frame portion 26. A plurality of dividing bars 23 extend from bar 21 of the top frame portion 24 to bar 25 of the bottom frame portion 26, to form dividing portion 22. The truck bed divider 20 further includes divider restraining portions 28 which extend from the divider 20 for bracing the divider 20 in a truck bed.

In a preferred embodiment, the top frame portion 24 includes bars 21 which form a rectangular shape for supporting the truck bed divider 20 in a truck bed and leaving the top region of the truck bed open. The preferred embodiment further includes a bottom frame portion 26 having a rectangular shape and support bars 29 which extend between and are one piece with the top frame portion 24 and bottom frame portion 26.

Figure 2:
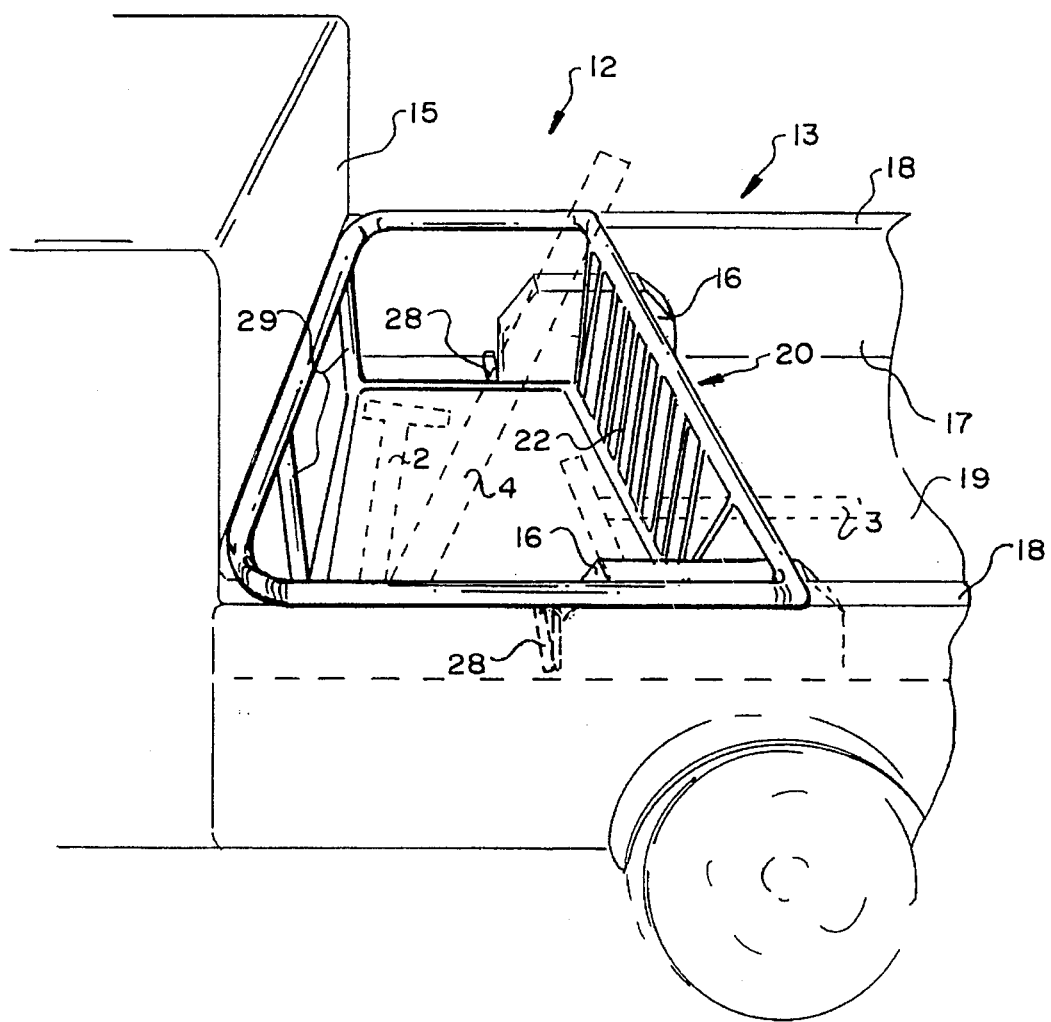
FIG. 2 is a perspective view of the removable, one-piece, truck bed divider according to the present invention which is positioned in a front portion a truck bed adjacent the truck cab.

The truck bed divider 20 is generally designed to fit the contour of a truck bed so that the truck bed divider 20 may be easily positioned in the truck bed and removed from the truck bed. In the preferred embodiment, shown in FIG. 2, the truck bed divider 20 is designed to be positioned in a front portion of the truck bed 13 between the truck cab 15 and wheel wells 16. The truck bed divider 20 is positioned in such a way that the truck bed divider 20 will not move or slide in the truck bed 13. In the preferred embodiment, movement of the truck bed divider 20 is prevented by one or more braces 28 which rest against the truck bed itself without physically coupling the divider 20 to the truck.

Thus, when the truck bed divider 20 is positioned in truck bed 13, the plurality of dividing bars 23 extend generally vertically to prevent loose articles 2, 4 contained in the divided region 14 of the truck bed from moving out of the divided region 14. The dividing bars 23 also allow longer tools or articles 3 to extend between the bars 23 into other regions of the truck bed 13 while still minimizing sliding of the article or tool in the truck bed 13.

When the truck bed divider 20 is positioned in the truck bed, the top frame portion 24 is generally positioned in a plane parallel to a plane of the open top region 17 of the truck bed 13. The top frame portion 24 supports the truck bed divider 20 in the truck bed 13 while leaving the top region 17 open allowing tools and articles 4 to extend above the top region when they are contained in the region 14 of the truck bed 13. In the preferred embodiment, the top frame portion 24 is positioned against sides 18 of the truck bed 13.

The bottom frame portion 26 is positioned against a floor 19 of the truck bed 13 and lies in a plane which is generally parallel to the plane of the top frame portion 24. In the preferred embodiment, the rectangular shaped bottom frame portion 26 has sides which abut the cab 15 and the wheel wells 16 in the truck bed 13 for bracing the divider 20. In the preferred embodiment, the support bars 29 extending between the top frame portion 24 and the bottom frame portion 26 add additional support for bracing the truck bed divider 20 against the cab 15.

The truck bed divider restraining portions or braces 28 abut a portion of the truck bed 13 to brace the truck bed divider 20 and prevent the truck bed divider 20 from moving in the truck bed 13 without actually physically coupling or fastening the truck bed divider 20 to the truck bed 13. In a preferred embodiment, the divider restraining portions 28 first and second include bracing bars extending from side portions 27 of the bottom frame portion 26. The restraining portions or bracing bars 28 abut wheel wells 16 in the truck bed 13 to brace the divider 20 in the front portion of the truck bed 13 and prevent the truck bed divider 20 from sliding to the rear portion of the truck bed.

Bracing, without coupling or fastening, allows the truck bed divider 20 to be easily and instantly lifted out of the truck bed. The ease of removing the truck bed divider without uncoupling or unfastening is a significant advantage when used at a job site. Quick removal allows use of the entire truck bed instantly without wasting time removing a tool box. Also, quick removal allows the truck bed divider and articles held therein to be stored away easily preventing theft.

In the preferred embodiment, the truck bed divider 20 is made of welded mild steel such that the top frame portion 24, the dividing portion 22, and the bottom frame portion 26 are welded together to form a single unitary piece. Alternatively, the truck bed divider 20 may be made of a molded plastic such that the top frame portion 24, the dividing portion 22 and the bottom frame portion 26 are molded as a single, unitary piece. The truck bed divider 20 according to the present invention, however, is not limited to these materials and may also include a wire or nylon web.

The truck bed divider may additionally include padding material for the dividing portion, frames or bracing bars; or a tarp or bungee cords for covering or securing articles in the region of the truck bed. However, the easily removable, one-piece structure of the truck bed divider, by itself, provides the significant advantages of securing loose articles in a truck bed while maintaining flexibility in removing the divider quickly and easily. Further, the open top region of the truck bed divider provides the advantage of carrying or holding articles of all sizes.

In light of the above, it is therefore understood that within the scope of the appended claims, the invention may be practiced otherwise than as specifically described.

What is claimed is:

1. A one-piece truck bed divider adapted to be easily and quickly removably positioned in a divided region of a truck bed, for containing loose articles in the divided region of the truck bed, said truck bed divider comprising:

a top frame portion defining a top frame open region, said top frame portion adapted to be positioned generally parallel to a substantially horizontal plane of a top region of said truck bed, and wherein said top frame open region is adapted to allow loose articles contained in the divided region of the truck bed to extend above the top region of the truck bed;

a bottom frame portion generally parallel to said top frame portion and adapted to be positioned adjacent a floor of the truck bed;

at least one divider restraining portion joined to said bottom frame portion and adapted to abut a portion of the truck bed without physically altering said truck bed, for bracing and preventing lateral movement of said truck bed divider in said truck bed; and a dividing portion including a plurality of bars extending from said top frame portion to said bottom frame portion and affixed to said top frame portion and said bottom frame portion, wherein said dividing portion prevents loose articles contained in the divided region of the truck bed by said truck bed divider from moving to another region of the truck bed.

2. The truck bed divider of claim 1 wherein said truck bed divider is adapted to fit between a cab and wheel wells of the truck.

3. The truck bed divider of claim 1 wherein said at least one divider restraining portion is adapted to abut at least one wheel well of the truck.

4. The truck bed divider of claim 3 wherein said at least one divider restraining portion includes bracing bars extending from said bottom frame portion for abutting the wheel well of the truck.

5. The truck bed divider of claim 1 wherein said top frame portion is generally rectangular and is adapted to fit over sides of the truck bed, and said bottom frame portion is generally rectangular and is adapted to fit between wheel wells of the truck bed.

6. The truck bed divider of claim 1 further including at least one support bar portion extending between said top frame portion and said bottom frame portion.

7. The truck bed divider of claim 1 wherein said truck bed divider is made of steel, and wherein said top frame portion, said bottom frame portion and said dividing portion are welded together as one piece.

8. The truck bed divider of claim 1 wherein said truck bed divider is made of molded plastic, and wherein said top frame portion, said bottom frame portion and said dividing portion are molded as one-piece.

9. A removable, one-piece truck bed divider adapted to fit the contour of and easily and quickly removably positioned in a front region of a truck bed adjacent a cab of a truck, for containing loose articles in the region of the truck bed, said removable, one-piece truck bed divider comprising:

a top frame portion having a generally rectangular shape and adapted to be positioned in a top region of the truck bed and to fit against side portions of the truck bed, wherein the top frame portion leaves the top region of the truck bed open to allow loose articles contained in said removable, one-piece truck bed divider to extend above the top region of the truck bed;

a bottom frame portion having a generally rectangular shape adapted to fit between and brace against wheel wells of the truck and to be positioned adjacent the floor of the truck bed;

a plurality of dividing bars extending between and joined to said top frame portion and said bottom frame portion, wherein said plurality of dividing bars are positioned vertically in the truck bed for preventing loose articles contained in the region of the truck by said removable, one-piece truck bed divider from moving to another region of the truck bed; and at least one bracing bar extending from a side portion of said bottom frame portion and adapted to abut a wheel well of the truck, for bracing and preventing movement of said removable, one-piece truck bed divider in the truck bed, wherein said removable, one-piece truck bed divider is braced in the truck bed without physically altering said truck bed.

* * * * *